United States Patent
Lee

(12) 
(10) Patent No.: US 7,069,055 B1
(45) Date of Patent: Jun. 27, 2006

(54) MOBILE TELEPHONE CAPABLE OF DISPLAYING WORLD TIME AND METHOD FOR CONTROLLING THE SAME

(75) Inventor: Hye-Young Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1114 days.

(21) Appl. No.: 09/118,100

(22) Filed: Jul. 17, 1998

(51) Int. Cl.
*H04Q 7/20* (2006.01)

(52) U.S. Cl. ............... 455/566; 455/418; 368/13; 368/21

(58) Field of Classification Search .......... 455/566, 455/550.1, 575.1; 368/21, 22, 47, 10
See application file for complete search history.

(56) References Cited

U.S. PATENT DOCUMENTS

| | | | | | |
|---|---|---|---|---|---|
| 4,217,653 | A | * | 8/1980 | Nakata | 708/206 |
| 4,245,323 | A | * | 1/1981 | Yamazaki et al. | 708/111 |
| 4,779,247 | A | * | 10/1988 | Uchida | 368/22 |
| 5,363,377 | A | * | 11/1994 | Sharpe | 370/314 |
| 5,375,018 | A | * | 12/1994 | Klausner et al. | 368/47 |
| 5,375,104 | A | * | 12/1994 | Ishii et al. | 368/22 |
| 5,448,532 | A | * | 9/1995 | Kataoka et al. | 368/10 |
| 5,528,558 | A | * | 6/1996 | Mardhekar et al. | 368/10 |
| 5,655,218 | A | * | 8/1997 | Smolinske | 455/566 |
| 5,708,628 | A | * | 1/1998 | Chen | 368/21 |
| 5,907,523 | A | * | 5/1999 | Richins | 368/21 |
| 5,920,824 | A | * | 7/1999 | Beatty et al. | 455/550 |
| 6,108,277 | A | * | 8/2000 | Whitmore | 368/15 |
| 6,223,050 | B1 | * | 4/2001 | Roberts, Jr. | 455/550 |

* cited by examiner

*Primary Examiner*—Erika A. Gary
(74) *Attorney, Agent, or Firm*—Dilworth & Barrese LLP

(57) ABSTRACT

An apparatus and method for calculating and displaying local time for a plurality of cities in the world. The apparatus includes a memory for storing Greenwich mean time (GMT) information for each of the plurality of cities. The apparatus sets a reference time and counts the time that elapses from when the reference time is set. The apparatus calculates a local time of a city selected by a user, which is based on a difference between the GMT of the selected city and the GMT of a present location of the apparatus, the reference time and the counted elapsed time. The reference time may be either a time set by the user or a system time acquired from a signal generated from a remote system.

8 Claims, 3 Drawing Sheets

MOBILE TELEPHONE CAPABLE OF DISPLAYING WORLD TIME AND METHOD FOR CONTROLLING THE SAME

BACKGROUND

1. Technical Field

The present application generally relates to an apparatus and method for providing local time information and, in particular, to a mobile telephone which is capable of calculating and displaying the local time for a plurality of cities in the world, and a method for controlling the same.

2. Description of the Related Art

The development of the industrial society has raised demands for mobile communication equipment such as mobile telephones. The mobile telephone has overcome the mobility limitation of the wired telephone, thereby contributing to the convenience of the users. Typically, mobile telephones have a clock function for displaying the regional time.

A user of a mobile telephone may occasionally want to know the local time of a certain city in a particular country. Conventionally, in order to determine this local time, the user would have to manually calculate the time difference between the user's present location and the desired city by using a world time table, which is a burdensome task. Therefore, there has been a demand for a mobile telephone which is capable of automatically calculating and displaying the local time of a desired city.

SUMMARY OF THE INVENTION

The present application is directed to an apparatus and method for calculating and displaying the local time for a plurality of cities in the world. In one aspect, an apparatus for displaying local time information, comprises: means for storing Greenwich mean time (GMT) information for each of a plurality of cities; means for setting a reference time; means for counting a duration of time that elapses from when the reference time is set; means for selecting at least one of the plurality of cities and calculating a local time of the selected city, the local time being based on a difference between the GMT of the selected city and the GMT of a present location of the apparatus, the reference time and the elapsed time; and means for outputting the local time.

The reference time may be either a time set by the user or a system time acquired from signal received from a remote system (e.g., a sync channel message received by a mobile telephone from a base station in a cellular communication system).

These and other objects, features and advantages of the present invention will become apparent from the following detailed description of illustrative embodiments, which is to be read in connection with the accompanying drawings.

DETAILED DESCRIPTION OF PREFERRED EMBODIMENTS

It is to be understood that in the following description of preferred embodiments, specific details are set forth to provide a more thorough understanding of the present invention, notwithstanding that one skilled in the art may practice the invention without these specific details. In other instances, a detailed description of well known functions or constructions have been omitted so as to not obscure the present invention.

Figure 1:
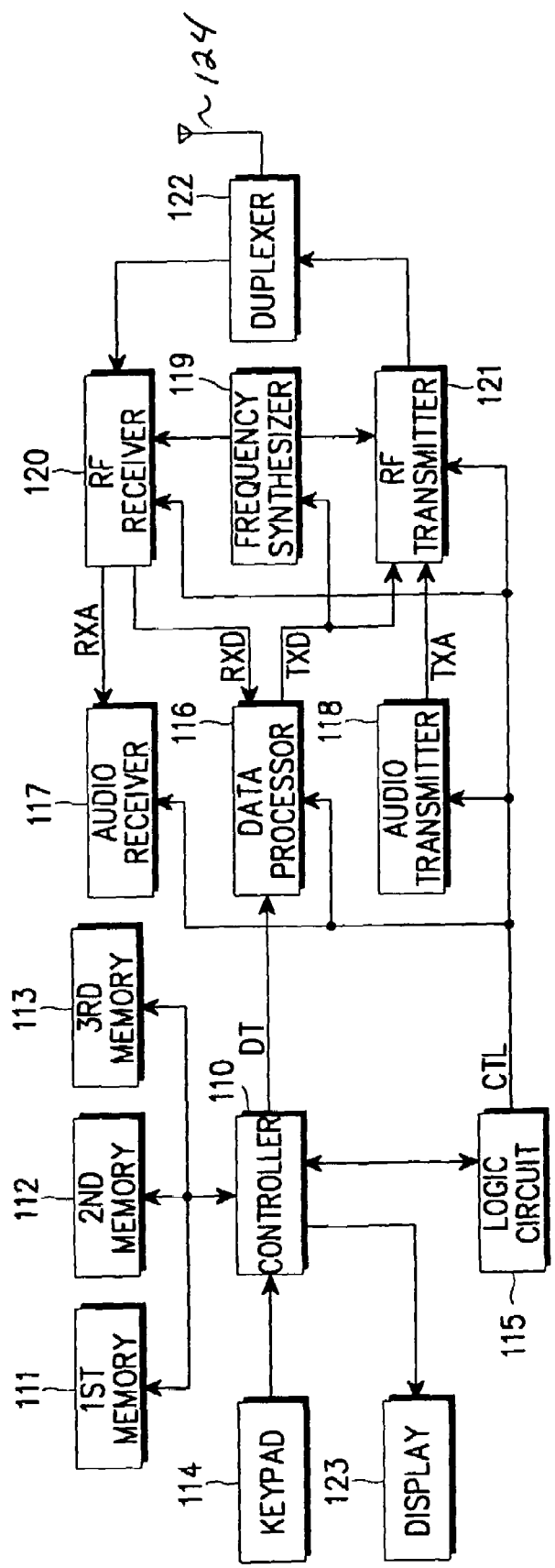
FIG. 1 is a block diagram of an apparatus in which the present invention can be implemented.

Referring now to FIG. 1, a block diagram illustrates a mobile telephone in which the present invention can be implemented. A controller 110 (e.g., microprocessor) controls the overall operations of the mobile telephone. In particular, the controller 110 enters into a "world time display mode" when the user inputs a command for displaying the local time of a certain city or country. In the "world time display mode", the controller 110 calculates the local time of the selected city by using a difference value between the Greenwich mean time (GMT) of the selected city and the GMT of the city where the mobile telephone is located, and the regional time. A first memory 111 (e.g., a flash memory), operatively connected to the controller 110, stores a control program for the controller 110, as well as initial service data and GMT data for each of the major cities in the world. A second memory 112 (e.g., random access memory (RAM)), operatively connected to the controller 110, temporarily stores data generated during operations of the mobile telephone, including the system time and a user set time. A third memory 113 (e.g., an electrically erasable and programmable read only memory (EEPROM)), operatively connected to the controller 110, stores the parameters required for the various operations of the mobile telephone, as well as telephone numbers input by the user. A keypad 114, operatively connected to the controller 110, generates key data for setting various operational modes of the mobile telephone, for selecting the city the local time of which the user desires to know, and for dialing the telephone number. The keypad 114 provides the controller 110 with the corresponding key data. A logic circuit 115 exchanges a plurality of data with the controller 110 and outputs control data to every functional element of the mobile telephone. A data processor 116 (e.g., a digital signal processor (DSP)) processes reception data ("RXD") output from a radio frequency (RF) receiver 120 and provides the processed reception data ("RXD") to the controller 110. Further, the data processor 116 processes transmission data DT output from the controller 110 and provides the processed transmission data TXD to an RF transmitter 121.

A duplexer 122, connected to an antenna 124, separates a transmission RF signal output from the RF transmitter 121 and a reception RF signal input to the RF receiver 120. A reception audio signal RXA and the reception data RXD output from the RF receiver 120 are transferred to an audio receiver 117 and the data processor 116, respectively. The audio receiver 117 reproduces the reception audio signal RXA. An audio transmitter 118 receives an input audio signal and generates a transmission audio signal TXA. The RF transmitter 121 receives the transmission data TXD and the transmission audio signal TXA, modulates them into the RF transmission signals, and then transfers the RF transmission signals to the duplexer 122. A frequency synthesizer 119 generates frequency synthesized signals for allocating a reception channel for the RF receiver 120 and a transmission channel for the RF transmitter 121 in accordance with a control data CTL output from the logic circuit 118.

A display 123 displays the world time under the control of the controller 110. The controller 110 includes internal counters such as a user set time counter and a system time counter. The user set time counter counts the time which elapses from the time set by the user, and a system time counter counts the elapsed time based on the system time received from the base station of the CDMA (Code Division Multiple Access) cellular system.

Figure 2A:
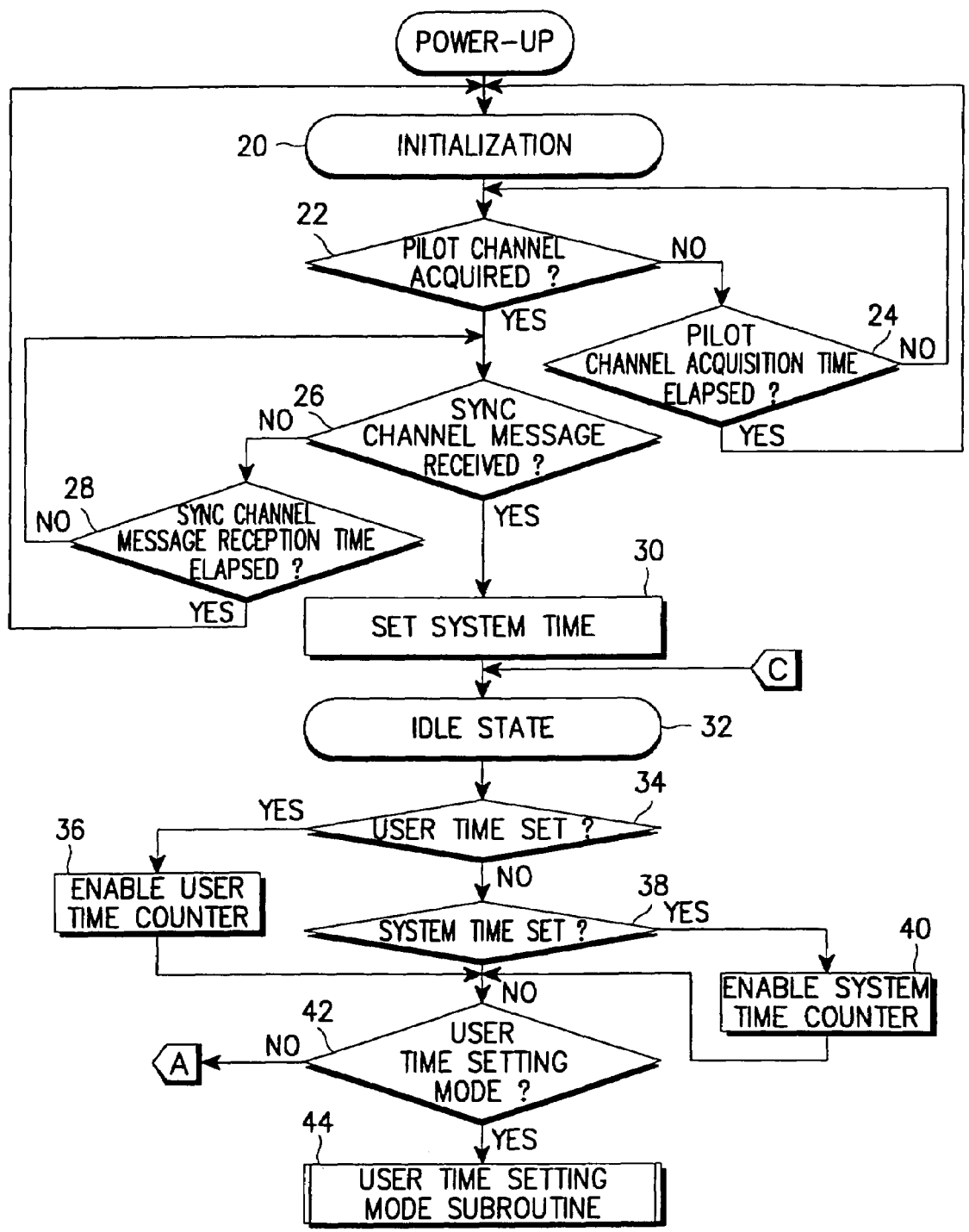
FIGS. 2A and 2B is a flow diagram illustrating a method for calculating and displaying the world time according to an embodiment of the present invention.
Figure 2B:
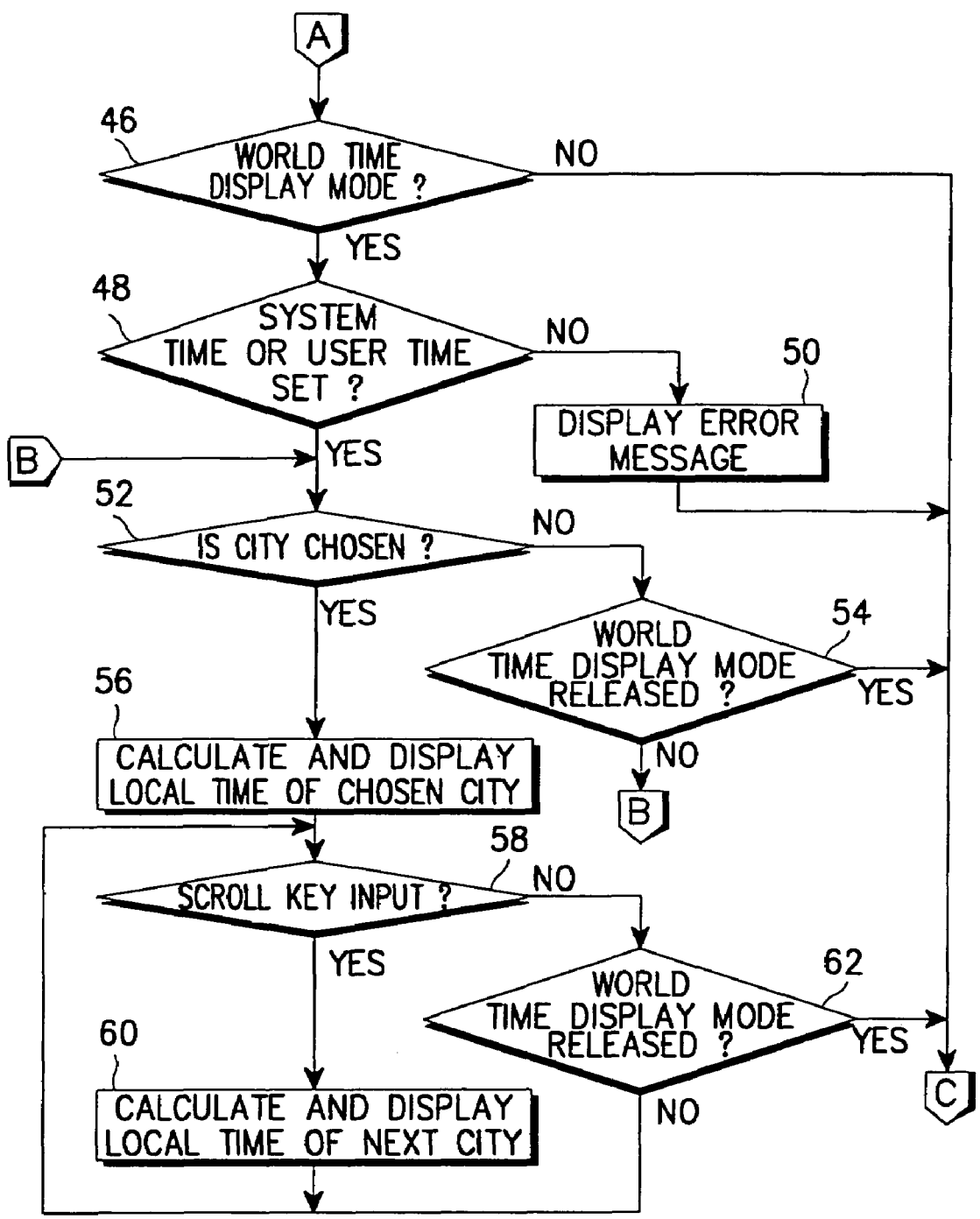

Referring now to FIGS. 2A and 2B, a flow chart illustrates a method for calculating and displaying the world time according to an embodiment of the present invention. Initially, the controller 110 initializes the mobile telephone when the user activates a power key which turns on the mobile telephone (step 20). After initialization, the controller 110 enters into a "pilot channel acquisition mode" whereby the controller 110 determines whether a pilot channel is acquired for communication with the base station (step 22). If the pilot channel is not acquired (negative result in step 22), the controller 110 determines whether the time allocated for acquiring the pilot channel has elapsed (step 24). If the pilot channel acquisition time has not elapsed (negative result in step 24), the controller 110 continues to check if a pilot channel has been acquired (return to step 22). On the other hand, if the pilot channel acquisition time has elapsed (positive result in step 24), the controller 110 enters into the "initialization mode" (return to step 20).

Once the pilot channel is acquired (positive result in step 22), the controller 110 enters into a "sync channel acquisition mode" and makes a determination as to whether a sync channel message is received from the base station (step 26). If the sync channel message is not received (negative result in step 26), the controller 110 determines whether the time allocated for receiving the sync channel message has elapsed (step 28). If the time for receiving the sync channel message has not elapsed (negative result in step 28), the controller 110 continues to check whether the sync channel message is received (return to step 26). On the other hand, if the prescribed time for receiving the sync channel message has elapsed (positive result in step 28), the controller returns to the "initialization mode" (return to step 20).

Once the sync channel message is received (positive result in step 26), the controller 110 extracts the system time, as well as various parameters, from the received sync channel message and stores the extracted data (step 30). In particular, the sync channel message includes information such as the system time, a local time offset (i.e., a time difference) between the system time and the regional time, and a leap second occurrence after the system time counter is enabled.

Next, the controller 110 enters into an "idle mode" (step 32), during which the controller 110 monitors a paging channel and determines whether the user makes an outgoing call or selects other functions. The controller 110 then determines whether the user has set the user time (e.g., via the keypad 114) (step 34). If the user time is set (positive result in step 34), the controller 110 enables the user set time counter to count the time which elapses from when the user time is set (step 36). If the user time is not set (negative result in step 34), the controller 110 determines whether the system time is set (step 38). If so (positive result in step 38), the controller 110 enables the system time counter to count the time which elapses from when the system time is set (step 40). On the other hand, if both the user time and the system time are not set (negative result in steps 34 and 38), the controller 110 determines if the user has selected a "user time setting mode" (step 42). If the "user time setting mode" is selected (positive result in step 42), the controller 110 enters into a "user time setting mode" and performs the user time setting subroutine to set the reference time (step 44).

On the other hand, if the "user time setting mode" is not set (negative result in step 42), the controller 110 determines whether the user has selected a "world time display mode" (step 46 in FIG. 2B). If the "world time display mode" is set (positive result in step 46), the controller 110 enters into the "world time display mode" and determines whether the system time or the user time are set (step 48). If it is determined that neither the system time nor the user time are set (negative result in step 48), the controller 110 displays (via the display 123) an error message notifying the user to set the system time or the user time (step 50) and the controller enters back into the "idle mode" (return to step 32 in FIG. 2A). On the other hand, if the controller 110 has either acquired the system time from the sync channel message or has the set user time (positive result in step 48), the controller 110 determines whether the user has selected a city for which the user wants to know the local time (step 52). If the user has selected a city (positive result in step 52), the controller 110 calculates the local time of the selected city based on the GMT of the selected city and the GMT of the present location, and either the system time or the user set time and the corresponding elapsed time, and then displays the calculated time on the display 123 (step 56).

On the other hand, if it is determined that the user has not selected a city (negative result in step 52), the controller 110 displays a message inquiring whether the user wants to terminate the "world time display mode", and then determines whether the user has elected to release the "world time display mode" (step 54). If so (positive result in step 54), the controller enters into the "idle mode" (return to step 32 FIG. 2A). If the user elects not to release the "world display mode" (negative result in step 54), the controller will continue to check if the user has selected a city (return to step 52).

After the calculated local time of the selected city is displayed (step 56), the controller 110 determines whether the user has activated a scroll key to select another city (step 58). If the user activates the scroll key (positive result in step 58), the controller 110 calculates the local time of the next city selected from a displayed city list and displays the calculated time on the display 123 (step 60). The controller 110 then determines whether the scroll key has been activated again (return to step 58). If the scroll key is not activated (negative result in step 58), the controller 110 displays a message inquiring whether the user wants to terminate "the world time display mode", and then determines whether the "world time display mode" has been released by the user (step 62). If the user releases the "world time display mode" (positive result in step 62), the controller enters into the "idle mode" (return to step 32 FIG. 2A). On the other hand, if the user elects to continue the "world time display mode" (negative result in step 62), the controller 110 determines whether the user has activated the scroll key (return to step 58) (i.e., selected another city). It is to be appreciated that the user can readily check the world time by having the mobile telephone display the local times of the major cities of the world (i.e., repeating steps 58, 60 and 62 to scroll through each city in the city list and calculate and display the corresponding local time).

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. An apparatus for displaying local time information, comprising:
    means for storing Greenwich mean time (GMT) information for each of a plurality of cities;
    means for receiving a reference time from a signal received from a remote system;
    means for counting a duration of time that elapses from when said reference time is acquired;
    means for selecting at least one of said plurality of cities and automatically calculating a local time of said selected city, said local time being based on a difference between the GMT of said selected city and the GMT of a present location of said apparatus, said reference time and said elapsed time; and
    means for outputting said local time.

2. The apparatus of claim 1, wherein said apparatus is a mobile telephone.

3. The apparatus of claim 2, wherein said reference time is a system time acquired from a sync channel message received by said mobile cellular phone from a base station of a CDMA (Code Division Multiple Access) cellular system.

4. In an apparatus having a display and a memory for storing Greenwich mean time (GMT) information for each of a plurality of cities, a method for generating local time information, comprising the steps of:
    receiving a reference time from a signal received from a remote system;
    counting a time which elapses from said acquiring of said reference time;
    selecting at least one of said plurality of cities;
    automatically calculating a local time of said selected city based on the difference between the GMT of said selected city and the GMT of a present location of said apparatus, said reference time and said elapsed time; and
    displaying said calculated local time.

5. The method of claim 4, further comprising the step of displaying a message to set a reference time if said step of setting a reference time does not occur.

6. The method of claim 4, wherein said step of selecting includes the substeps of:
    displaying a list of said plurality of cities; and
    scrolling through said list to select a desired one of said plurality of cities.

7. The method of claim 4, wherein said apparatus is a mobile telephone.

8. The method of claim 7, wherein said reference time is a system time acquired from a sync channel message received from a base station of a CDMA cellular system.

* * * * *